United States Patent
Cui

(10) Patent No.: US 10,677,449 B1
(45) Date of Patent: Jun. 9, 2020

(54) MULTIFUNCTIONAL INDUCTIVE LAMP

(71) Applicant: Ningbo Fiercer Leopard Electrical Appliance Co., Ltd., Ningbo, Zhejiang (CN)

(72) Inventor: Jianqing Cui, Zhejiang (CN)

(73) Assignee: Ningbo Fiercer Leopard Electrical Appliance Co., Ltd., Ningbo (CN)

( * ) Notice: Subject to any disclaimer, the term of this patent is extended or adjusted under 35 U.S.C. 154(b) by 0 days.

(21) Appl. No.: 16/417,603

(22) Filed: May 20, 2019

(30) Foreign Application Priority Data

Apr. 1, 2019 (CN) .................... 2019 2 0432326 U

(51) Int. Cl.
| | |
|---|---|
| *F21V 33/00* | (2006.01) |
| *F21V 3/00* | (2015.01) |
| *F21V 21/02* | (2006.01) |
| *H04N 5/225* | (2006.01) |
| *F21V 23/04* | (2006.01) |
| *F21Y 115/10* | (2016.01) |

(52) U.S. Cl.
CPC ............ *F21V 33/0056* (2013.01); *F21V 3/00* (2013.01); *F21V 21/02* (2013.01); *F21V 23/0471* (2013.01); *H04N 5/2253* (2013.01); *H04N 5/2257* (2013.01); *F21Y 2115/10* (2016.08)

(58) Field of Classification Search
CPC .. F21V 33/0056; F21V 21/02; F21V 23/0471; H04N 5/2257; H04N 5/2253
See application file for complete search history.

(56) References Cited

U.S. PATENT DOCUMENTS

| | | | | |
|---|---|---|---|---|
| 9,903,576 | B2 * | 2/2018 | Creasman | F21V 23/0464 |
| 9,948,837 | B1 * | 4/2018 | Gartrell | B60R 11/04 |
| 2006/0044789 | A1 * | 3/2006 | Curtis | F21S 8/088 |
| | | | | 362/152 |
| 2010/0128446 | A1 * | 5/2010 | DiPoala | G08B 17/00 |
| | | | | 361/729 |
| 2011/0085040 | A1 * | 4/2011 | Joslyn | G08B 13/196 |
| | | | | 348/157 |
| 2016/0105847 | A1 * | 4/2016 | Smith | H04L 67/125 |
| | | | | 370/252 |
| 2016/0313636 | A1 * | 10/2016 | Chien | G03B 21/2046 |
| 2017/0318200 | A1 * | 11/2017 | Cox | H04N 5/23206 |
| 2019/0215423 | A1 * | 7/2019 | Ortiz | G03B 17/02 |
| 2019/0230324 | A1 * | 7/2019 | Chien | H04N 5/76 |

\* cited by examiner

*Primary Examiner* — Donald L Raleigh

(57) ABSTRACT

A multifunctional inductive lamp includes a lamp housing having a structure in a cylinder shape. A mounting seat capable of rotating around a central axis is arranged at a lower end of the lamp housing. A camera is movably connected to a lower end of the mounting seat via a transversely arranged rotation shaft and is provided with a sound collector and a data storage. A surface of the lamp housing is provided therein with a first groove extending along an axial direction, the first groove having a cross-section in a sector shape with an angle of not less than 180°, being provided therein with an LED lamp set, and being covered on a surface thereof with a light-transmitting lamp-shade. An inductive detector is arranged at a lower portion of the lamp housing.

1 Claim, 2 Drawing Sheets

MULTIFUNCTIONAL INDUCTIVE LAMP

CROSS REFERENCE TO RELATED APPLICATIONS

The present application claims the benefit of Chinese Patent Application No. 201920432326.X filed on Apr. 1, 2019, the contents of which are incorporated herein by reference in its entirety.

FIELD OF THE INVENTION

The present application relates to the technical field of illumination, and in particular, to a multifunctional inductive lamp.

BACKGROUND OF THE INVENTION

At present, corridor lamps of various residential districts and office buildings are all designed in a humanized manner, for example, as being acoustic control inductive or electrostatic touch inductive, which fundamentally solves the problem of resource consumption due to overnight illumination of the corridor lamps. However, since an acoustic control switch cannot distinguish a sound source, a corridor lamp is switched on as long as there is a huge sound caused by a non-subjective factor, such as a sound of setting off firecrackers or fireworks, which also causes waste of resources; and an electrostatic touch inductive lamp can only be switched on when a person touches an inductive switch thereof in the dark, which is still relatively inconvenient for old people and night blindness patients.

Therefore, inductive lamps are increasingly used in the daily life, because the inductive lamps can automatically sense passing-by of a person, save energy, and are convenient to use. However, there are some problems with inductive lamps in the market. 1. Functions of the inductive lamps are too limited, as they can only be turned on when a person comes near the lamp and turned off when the person goes away from the lamp. That is, these inductive lamps only provide a single function of illumination, and do not have other functions. 2. For an existing inductive lamp, much attention is paid to a sensing function thereof, while designs of its configuration and structure are neglected, which causes large space occupation of a lamp body and lack of beauty in structure. Moreover, an illumination angle of the lamp body is limited, and it is not sufficient to illuminate an entire corridor.

With respect to the above problems, the inventor of the present application has conducted in-depth studies. By virtue of years of research and development and manufacturing experience in related industries and after long-term efforts, the inventor finally successfully develops the present application "multifunctional inductive lamp" so as to make improvements with regard to the problems in existing technologies.

SUMMARY OF THE INVENTION

The technical problem to be solved by the present application is to provide a multifunctional inductive lamp. The multifunctional inductive lamp has a plurality of functions and can be connected with a monitoring system; and the multifunctional inductive lamp has a unique structural configuration which can meet an illumination angle required by a space.

A technical solution used by the present application for solving the above technical problem is as follows. A multifunctional inductive lamp is provided. The multifunctional inductive lamp comprises a lamp housing having a structure in a cylinder shape, wherein a mounting seat capable of rotating around a central axis is arranged at a lower end of the lamp housing, wherein a camera is movably connected to a lower end of the mounting seat via a transversely arranged rotation shaft, the camera being provided with a sound collector and a data storage, wherein a surface of the lamp housing is provided therein with a first groove extending along an axial direction, the first groove having a cross-section in a sector shape with an angle of not less than 180°, being provided therein with an LED lamp set, and being covered on a surface thereof with a light-transmitting lampshade, wherein an inductive detector is arranged at a lower portion of the lamp housing.

A further preferred solution of the present application is as follows. A back surface of the lamp housing is provided with a fixing seat used for installation. A back surface of the fixing seat is a flat structure adapted to a wall, and a front surface of the fixing seat is a recessed surface in an arc shape and is adapted to the structure of the lamp housing.

A further preferred solution of the present application is as follows. A surface of the lamp housing for contacting the fixing seat is provided thereon with a plurality of fixing components, and the lamp housing is fixed in front of the fixing seat via the plurality of fixing components.

A further preferred solution of the present application is as follows. A second groove is arranged under the first groove, and the second groove has a cross-section in a sector shape with an angle of not less than 180°. The inductive detector is arranged within the second groove.

A further preferred solution of the present application is as follows. The mounting seat has a structure in a shape of a truncated cone and is movably connected to the lamp housing via a vertical shaft, and an outer diameter of the mounting seat is the same as an outer diameter of the lamp housing.

A further preferred solution of the present application is as follows. The lamp housing is provided therein with a control circuit, and the inductive detector and the LED lamp set are both connected to the control circuit.

A further preferred solution of the present application is as follows. A bottom surface of the mounting seat is provided thereon with a baffle plate having a sheet structure in an arc shape, and the baffle plate is located above the camera and extends beyond a front side of the mounting seat.

Compared with the existing technologies, advantages of the present application lie in the following aspects. First, a lamp housing having a structure in a cylinder shape is used, so that when the present application is arranged on a surface of a wall, it has an aesthetic appearance as a whole. A mounting seat capable of rotating around a central axis is arranged at a lower end of the lamp housing, so that a full-angle rotation of the mounting seat in a horizontal plane can be achieved; and a camera is movably connected to a lower end of the mounting seat via a transversely arranged rotation shaft, so that a large-angle rotation of the camera in a vertical plane can be achieved. The camera is provided with a sound collector and a data storage, so that the camera provided with the sound collector and the data storage can be used to monitor and collect audio and video signals of a stair and a passage and store data in the data storage. The data storage is provided with a storage card so as to facilitate later query of the audio and video signals stored therein. The present application can be used as a monitoring device so as to achieve multiple functions. A surface of the lamp housing is provided therein with a first groove extending along an axial direction. The first groove has a cross-section in a sector shape with an angle of not less than 180°, is provided therein with an LED lamp set, and is covered on a surface thereof with a light-transmitting lampshade. An inductive detector is arranged at a lower portion of the lamp housing. By making such an arrangement that the first groove is provided therein with an LED lamp set and has a cross-section in a sector shape with an angle of not less than 180°, it can be ensured that an illumination angle of the LED lamp set in the horizontal plane is not less than 180°. The present application is generally installed on a wall, and this illumination angle can satisfy the illumination needs.

BRIEF DESCRIPTION OF THE DRAWINGS

The present application will be described in a more detailed way below with reference to the accompanying drawings and based on preferred embodiments. However, it should be understood by those skilled in the art that these accompanying drawings are drawn only for the purpose of explaining the preferred embodiments, and thus should not be considered as a limitation to the scope of the present application. In addition, unless specifically indicated, the accompanying drawings only schematically and conceptually show the components or structure of the subject described and possibly include exaggerated illustration, and the accompanying drawings are not necessarily drawn according to proportions.

DETAILED DESCRIPTION OF THE EMBODIMENTS

The present application will be described in detail below with reference to the accompanying drawings.

In order to make the objectives, the technical solutions and advantages of the present application clearer, the present application will be described in a more detailed way below with reference to the accompanying drawings and based on the embodiments. It should be understood that the specific embodiments described here are only used to explain the present application rather than to limit the present application.

Figure 1:
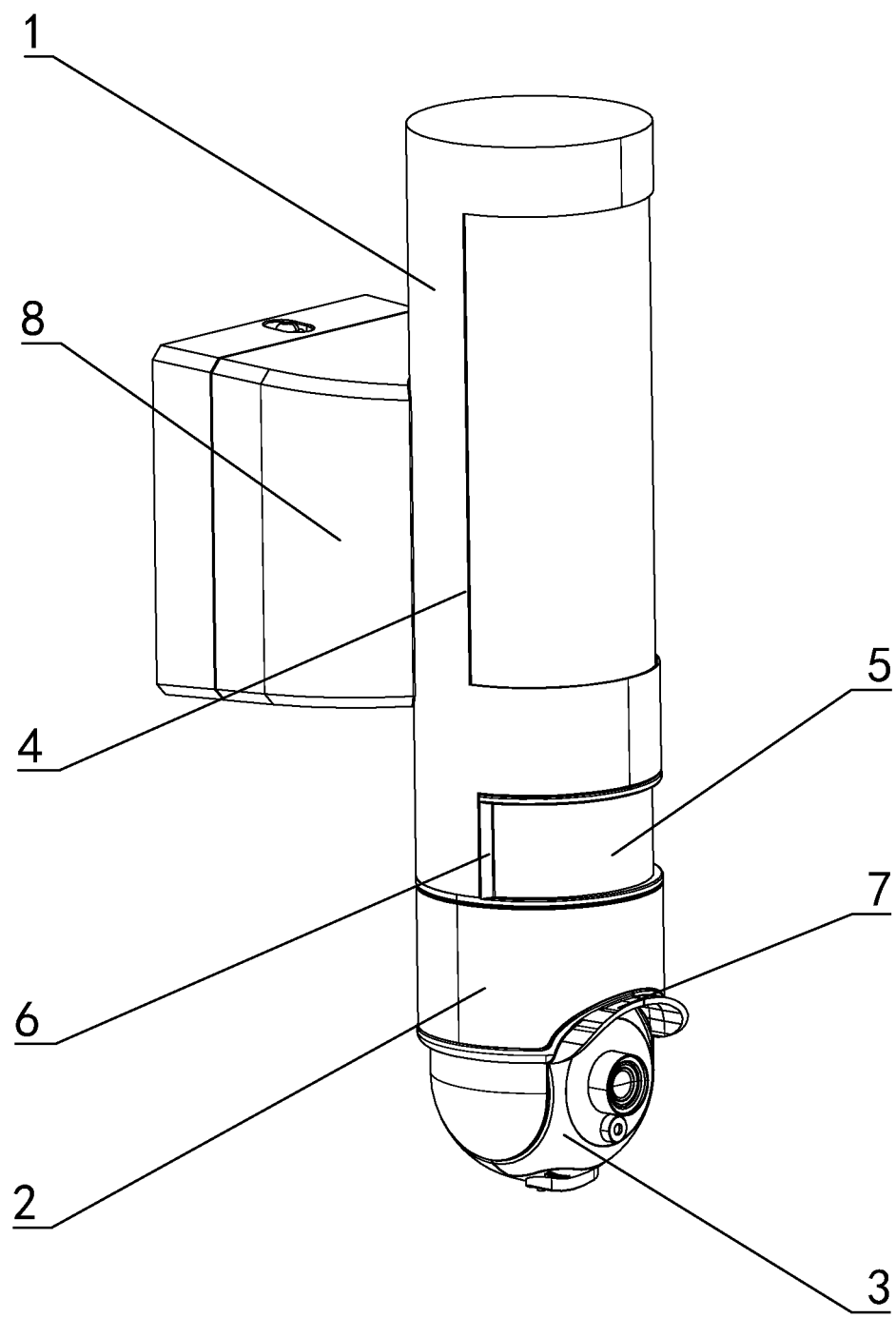
FIG. 1 is a first schematic view of a structure of the present application.
Figure 2:
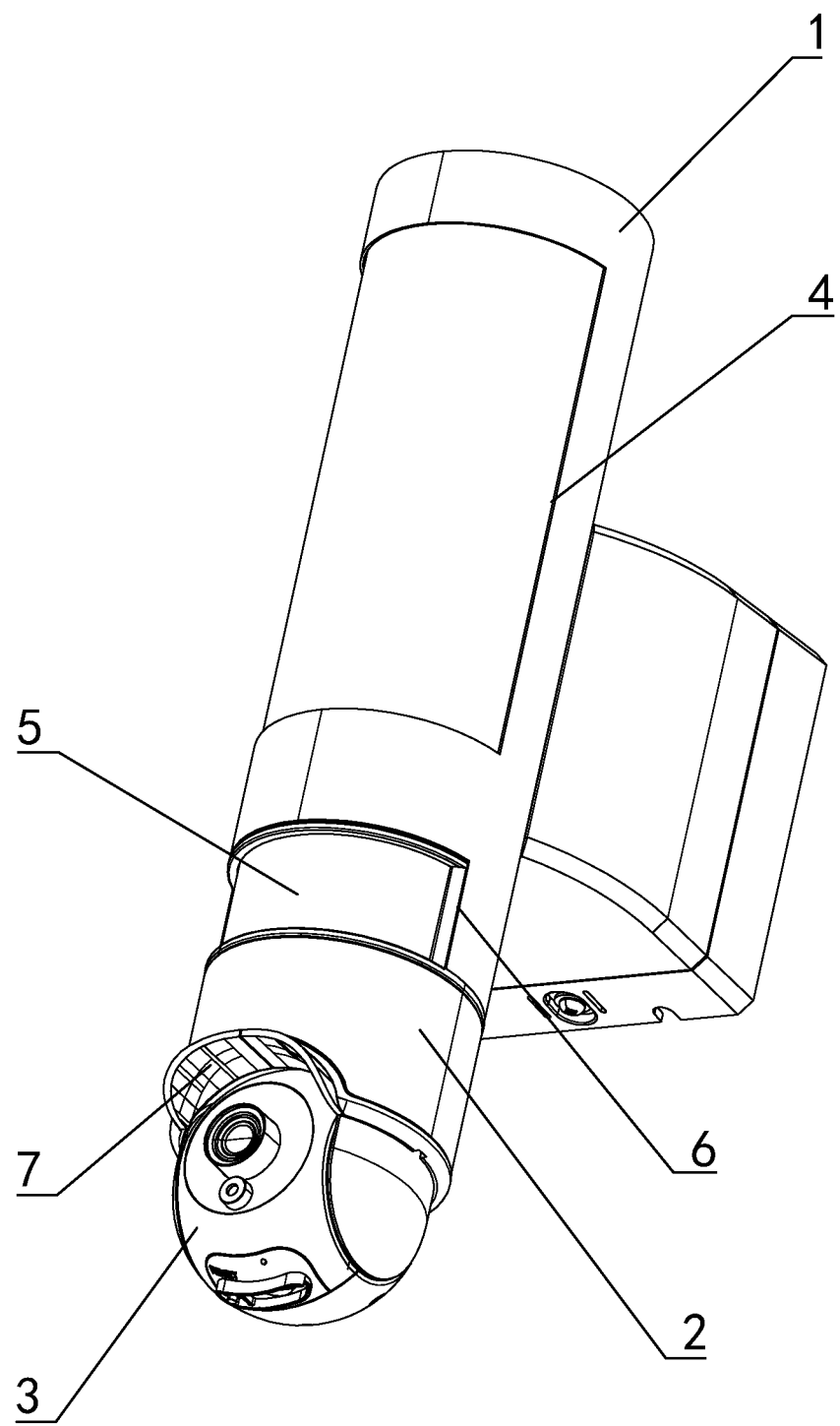
FIG. 2 is a second schematic view of the structure of the present application.

As shown in FIG. 1 and FIG. 2, a multifunctional inductive lamp comprises a lamp housing 1 which has a structure in a cylinder shape. A mounting seat 2 capable of rotating around a central axis is arranged at a lower end of the lamp housing 1. A camera 3 is movably connected to a lower end of the mounting seat 2 via a transversely arranged rotation shaft. The camera 3 is provided with a sound collector and a data storage. A surface of the lamp housing 1 is provided therein with a first groove 4 extending along an axial direction. The first groove 4 has a cross-section in a sector shape with an angle of not less than 180°, is provided therein with an LED lamp set, and is covered on a surface thereof with a light-transmitting lampshade. At a lower portion of the lamp housing 1, an inductive detector 5 is arranged.

A back surface of the lamp housing 1 is provided with a fixing seat 8 used for installation. A back surface of the fixing seat 8 is a flat structure adapted to a wall. A front surface of the fixing seat 8 is a recessed surface in an arc shape, and the front surface of the fixing seat 8 is adapted to the structure of the lamp housing 1.

A surface of the lamp housing 1 for contacting the fixing seat 8 is provided thereon with a plurality of fixing components, and the lamp housing 1 is fixed in front of the fixing seat 8 via the plurality of fixing components.

Under the first groove 4, a second groove 6 is provided, and the second groove 6 has a cross-section in a sector shape with an angle of not less than 180°. The inductive detector 5 is arranged within the second groove 6.

The mounting seat 2 has a structure in a shape of a truncated cone and is movably connected to the lamp housing 1 via a vertical shaft, and an outer diameter of the mounting seat 2 is the same as an outer diameter of the lamp housing 1. This enables a surface of the mounting seat 2 and a surface of the lamp housing 1 to visually appear to be in one piece and more aesthetic.

The lamp housing 1 is provided therein with a control circuit, and the inductive detector 5 and the LED lamp set are both connected to the control circuit. In the present application, the camera 3 is also designed to be connected to the control circuit. When no one passes by the lamp, the camera 3 is in a stand-by state. When the inductive detector 5 detects that someone passes by the lamp, the LED lamp set is turned on, and the camera 3 quickly captures audio and video signals of a passer-by.

A bottom surface of the mounting seat 2 is provided thereon with a baffle plate 7 having a sheet structure in an arc shape. The baffle plate 7 is located above the camera 3 and extends beyond a front side of the mounting seat 2. In the present application, the camera 3 and the LED lamp set above the camera 3 are separated by the sheet structure in the arc shape. Effects of light of the luminous LED lamp set on working of the camera 3 can thus be avoided.

The present application is described in detail hereinabove. Principles and implementing manners of the present application are described in detail herein by using specific examples, and the above illustration of the embodiments is only used to help to understand the present application and the core concept thereof. It should be noted that those skilled in the art can make various improvements and modifications to the present application without departing from the principles of the present application, and such improvements and modifications also fall within the protection scope of the present application.

The invention claimed is:

1. A multifunctional inductive lamp, comprising a lamp housing which has a structure in a cylinder shape, wherein a mounting seat capable of rotating around a central axis is arranged at a lower end of the lamp housing, wherein a camera is movably connected to a lower end of the mounting seat via a transversely arranged rotation shaft, the camera being provided with a sound collector and a data storage, wherein a surface of the lamp housing is provided therein with a first groove extending along an axial direction, the first groove having a cross-section in a sector shape with an angle of not less than 180°, being provided therein with an LED lamp set, and being covered on a surface thereof with a light-transmitting lampshade, wherein an inductive detector is arranged at a lower portion of the lamp housing, wherein a bottom surface of the mounting seat is provided thereon with a baffle plate having a sheet structure in an arc shape, and the baffle plate is located above the camera and extends beyond a front side of the mounting seat.

* * * * *